United States Patent
Crawford et al.

(10) Patent No.: US 11,379,335 B2
(45) Date of Patent: Jul. 5, 2022

(54) SELF-REPORTING REMOTE COPY PERFORMANCE ON A CONSISTENCY GROUP

(71) Applicant: INTERNATIONAL BUSINESS MACHINES CORPORATION, Armonk, NY (US)

(72) Inventors: Joshua J. Crawford, Tucson, AZ (US); Paul A. Jennas, II, Tucson, AZ (US); Jason L. Peipelman, Austin, TX (US); Matthew J. Ward, Vail, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 866 days.

(21) Appl. No.: 15/725,773

(22) Filed: Oct. 5, 2017

(65) Prior Publication Data

US 2019/0108113 A1 Apr. 11, 2019

(51) Int. Cl.
*G06F 11/34* (2006.01)
*G06F 11/30* (2006.01)
*G06F 11/20* (2006.01)

(52) U.S. Cl.
CPC ...... *G06F 11/3409* (2013.01); *G06F 11/3006* (2013.01); *G06F 11/3034* (2013.01); *G06F 11/2064* (2013.01)

(58) Field of Classification Search
CPC ............ G06F 11/3409; G06F 11/3006; G06F 11/3034; G06F 11/2064; G06F 11/2069
See application file for complete search history.

(56) References Cited

U.S. PATENT DOCUMENTS

| | | | | |
|---|---|---|---|---|
| 5,504,861 A | * | 4/1996 | Crockett | G06F 11/1435 714/13 |
| 5,734,818 A | * | 3/1998 | Kern | G06F 11/2064 714/20 |
| 6,199,074 B1 | * | 3/2001 | Kern | G06F 11/2058 |
| 6,493,796 B1 | | 12/2002 | Arnon et al. | |

(Continued)

FOREIGN PATENT DOCUMENTS

EP 1837769 A2 9/2007

OTHER PUBLICATIONS

IBM, "IBM XIV Storage System—Version 11.5.1" 2015, GC27-3912-07 (Year: 2015).*

(Continued)

*Primary Examiner* — Pierre M Vital
*Assistant Examiner* — Zuheir A Mheir
(74) *Attorney, Agent, or Firm* — Caleb D. Wilkes

(57) ABSTRACT

A method, computer system, and a computer program product for collecting performance data on a consistency group boundary is provided. The present invention may include positioning a plurality of software applications into idle mode. The present invention may also include starting a consistency group based on a command from a Global Mirror Master. The present invention may then include collecting a plurality of performance data associated with the started consistency group. The present invention may then include removing a plurality of remaining data associated with the collected plurality of performance data. The present invention may further include ending the collection of the collected plurality of data.

20 Claims, 5 Drawing Sheets

(56) References Cited

U.S. PATENT DOCUMENTS

| | | | |
|---|---|---|---|
| 7,539,745 B1 | 5/2009 | Wang et al. | |
| 8,185,663 B2 | 5/2012 | Cochran et al. | |
| 8,744,806 B2* | 6/2014 | Bakalov | H04L 41/042 |
| | | | 702/186 |
| 9,280,296 B2 | 3/2016 | Crawford et al. | |
| 9,396,087 B2* | 7/2016 | Nakazawa | H04L 43/0817 |
| 9,471,499 B2 | 10/2016 | Brown et al. | |
| 10,275,320 B2* | 4/2019 | Thanasekaran | G06F 11/3409 |
| 10,379,988 B2* | 8/2019 | Kochunni | G06F 11/3442 |
| 10,387,448 B2* | 8/2019 | Xu | G06F 11/2094 |
| 10,664,368 B2* | 5/2020 | McBride | G06F 11/3419 |
| 2007/0156983 A1* | 7/2007 | Kern | G06F 11/2064 |
| | | | 711/162 |
| 2008/0010496 A1* | 1/2008 | Das | G06F 11/2064 |
| | | | 714/6.12 |
| 2008/0294859 A1* | 11/2008 | Nguyen | G06F 11/1461 |
| | | | 711/162 |
| 2008/0301076 A1* | 12/2008 | Timmins | G06Q 10/06 |
| | | | 706/46 |
| 2008/0307271 A1* | 12/2008 | Nakajima | G06F 3/067 |
| | | | 714/47.2 |
| 2009/0307166 A1* | 12/2009 | Routray | G06N 5/04 |
| | | | 706/46 |
| 2012/0078848 A1* | 3/2012 | Jennas, II | G06F 16/1844 |
| | | | 707/649 |
| 2012/0124308 A1* | 5/2012 | Harris, Jr. | G06F 11/3485 |
| | | | 711/162 |
| 2012/0151163 A1* | 6/2012 | Ripberger | G06F 11/2066 |
| | | | 711/162 |
| 2012/0226877 A1* | 9/2012 | Clayton | G06F 11/1446 |
| | | | 711/162 |
| 2014/0180664 A1* | 6/2014 | Kochunni | G06F 11/3442 |
| | | | 703/21 |
| 2015/0112931 A1* | 4/2015 | Bourbonnais | G06F 16/27 |
| | | | 707/626 |
| 2015/0286433 A1* | 10/2015 | Dain | G06F 3/0655 |
| | | | 711/103 |
| 2016/0196089 A1* | 7/2016 | Gadre | G06F 3/0617 |
| | | | 711/114 |
| 2017/0187600 A1* | 6/2017 | Shazly | H04L 63/20 |
| 2017/0315728 A1* | 11/2017 | Zheng | G06F 3/0604 |
| 2018/0113640 A1* | 4/2018 | Fernandez | G06F 3/061 |

OTHER PUBLICATIONS

Nick Clayton, Global Mirror Whitepaper Sep. 15, 2008, IBM, Version: V2 (Year: 2008).*

Jon Tate, Mar. 2013 "IBM System Storage SAN Volume Controller and Storwize V7000 Replication Family Services", IBM RedBooks, Ref. No. SG24-7574-02 (Year: 2013).*

IBM System Storage SAN Volume Controller and Storwize V7000 Replication Family Services (Year: 2013).*

Choy et al., "Disaster Recovery Techniques for Database Systems," Communications of the ACM, Nov. 2000, p. 272-280, vol. 43, Issue 11, Article No. 6.

Clayton, "Global Mirror Whitepaper," IBM Whitepaper, Sep. 15, 2008, p. 1-30, Version V2, IBM Corporation.

Mell et al., "The NIST Definition of Cloud Computing," National Institute of Standards and Technology, Sep. 2011, p. 1-3, Special Publication 800-145.

* cited by examiner

SELF-REPORTING REMOTE COPY PERFORMANCE ON A CONSISTENCY GROUP

BACKGROUND

The present invention relates generally to the field of computing, and more particularly to data computing.

In enterprise storage environments, Global Mirror™ (e.g., Global Mirror™ Global Mirror, and all Global Mirror-based trademarks and logos are trademarks of International Business Machines Corporation and/or its affiliates) (GM) is an asynchronous peer-to-peer remote copy (PPRC) with a two-site unlimited distance data replication solution that provides business continuity and disaster recovery for valuable data. Global Mirror™ Recovery Point Objective (RPO) represents how much data is lost in the case of a disaster. To monitor system performance, customer setup tools may be used, such as resource measurement facility/Tivoli® (e.g., Tivoli®, Tivoli and all Tivoli-based trademarks and logos are trademarks or registered trademarks of International Business Machines Corporation and/or its affiliates) storage productivity center (RMF/TPC). These tools require connections to all boxes in the GM configuration.

SUMMARY

Embodiments of the present invention disclose a method, computer system, and a computer program product for collecting performance data on a consistency group (CG) boundary. The present invention may include positioning a plurality of software applications into idle mode. The present invention may also include starting a consistency group based on a command from a Master of a two-site data replication program. The present invention may then include collecting a plurality of performance data associated with the started consistency group. The present invention may then include removing a plurality of remaining data associated with the collected plurality of performance data. The present invention may further include ending the collection of the collected plurality of data.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
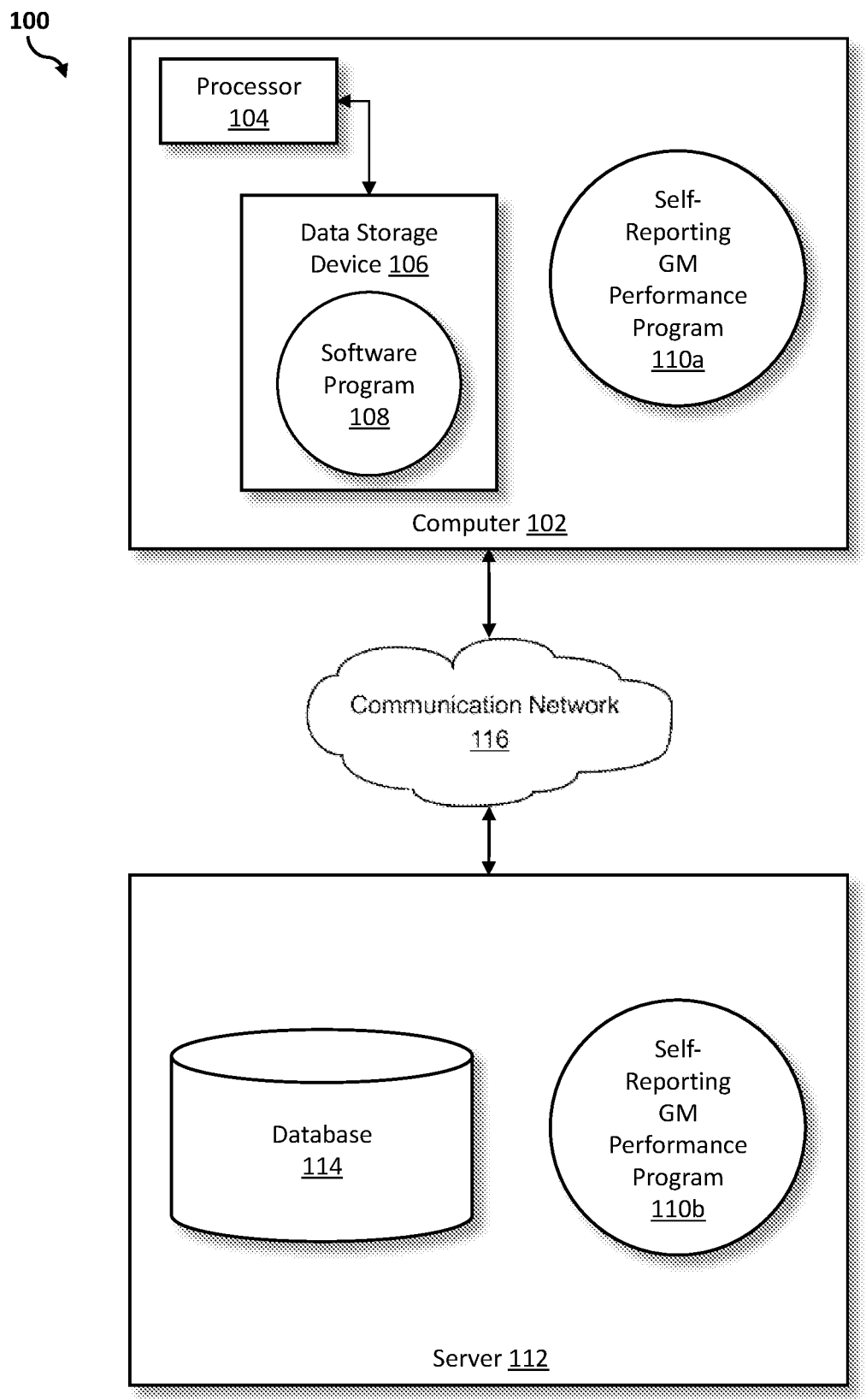
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for collecting performance data on a consistency group (CG) boundary. As such, the present embodiment has the capacity to improve the technical field of data computing by collecting primary and secondary data on a CG boundary and storing the CG into a database. More specifically, the GM Master may command the start of the data collection process of the CG cycle in which primary data may be collected by the primary disk subsystems (i.e., primary systems) including the GM Master. The self-reporting GM performance program may drain the remaining customer data from the primary systems, and then the self-reporting GM performance program may enter the FlashCopy® phase in which the self-reporting GM performance program may stop collecting primary data as directed by GM Master or other primary systems. (Flash-Copy®, FlashCopy, and all FlashCopy-based trademarks and logos are trademarks or registered trademarks of International Business Machines Corporation and/or its affiliates.) Then, the self-reporting GM performance program may proceed to finish/harden CG in which the GM Master may command the primary systems to collect secondary data and continue the CG cycle. After the secondary data has been collected by the secondary systems, then the secondary data may be transmitted to the corresponding primary systems which send the secondary data to the GM Master. The GM Master may then bundle the primary and secondary data and create a CG. The CG may then be stored in a database for retrieval at a later time.

As described previously, in enterprise storage environments, Global Mirror™ (GM) is an asynchronous peer-to-peer remote copy (PPRC) with a two-site unlimited distance data replication solution that provides business continuity and disaster recovery for valuable data. Global Mirror™ Recovery Point Objective (RPO) represents how much data is lost in the case of a disaster. To monitor system performance, customer setup tools like resource measurement facility/Tivoli® storage productivity center (RMF/TPC) may be used. These tools require connections to all boxes in the GM configuration.

However, some customers do not own the secondary box, or connection to a secondary box is difficult. If the RPO is not at a desirable level, customers will collect resource measurement facility (RMF) data and statesaves from the boxes and send the boxes to a team of experts to analyze, which may be a slow and cumbersome process that requires real expertise to analyze correctly. In addition, RMF does not work properly with RPO. Therefore, customers utilize another tool, such as Global Mirror™ Monitor (GMMON) that is an external tool to monitor Global Mirror™ for consistency group formation, which uses command-line (CLI) queries to check consistency group (CG) formation time. Then the RMF data, statesave data and GMMON data have to be aligned with each other to obtain the entire picture.

Therefore, it may be advantageous to, among other things, provide an internal self-reporting system to customers and performance engineers that utilizes the internal DS8000 Global Mirror™ process to collect performance data on a consistency group (CG) boundary. Such an internal self-reporting system may improve efficiency and provide a much faster way to both view and improve GM RPO times.

According to at least one embodiment, the self-reporting GM performance program may be integrated into software applications to recover and troubleshoot performance issues based on the data collected from the software application. As an internal program integrated into the existing software application which the data is collected from, the self-reporting GM performance program may improve simplicity, accuracy and efficiency when monitoring, analyzing and reporting performance issues for software applications.

According to at least one embodiment, the self-reporting GM performance program may utilize a known algorithm to coordinate the collection of data, and to generate recommendations in terms of tuning. In the present embodiment, the data regarding the formation of consistency groups (CGs) and the performance of the connections between the primary disk subsystems (i.e., primary systems) and secondary disk subsystems (i.e., secondary systems) may be recorded. Additionally, the GM Master may be one of the primary systems. However, unlike the other primary systems, the GM Master may control the operation of the self-reporting GM performance program.

According to at least one embodiment, during the start of the CG cycle, the primary systems in the self-reporting GM performance program may collect at least the following performance data (i.e., primary data): average response time per GM input/output (I/O); list of events that could pertain to GM performance (e.g., array rebuilds); host writes in megabytes per second (MB/s); and time of CG broke down by state (e.g., done on the GM Master only).

According to at least one embodiment, during the FlashCopy® phase in which the data is hardened to the tertiary volumes, the primary systems may collect the following performance data: number of full track transfers; number of partial track transfers and average transfer size; average PPRC response time from secondary systems; average MB/s in flight per replication port; average number of data mover trusted computing bases (TCBs) per replication port; maximum number of data mover TCBs; maximum number of sync agents reached per rank; average available bandwidth per port; and average used bandwidth per port.

According to at least one embodiment, during the FlashCopy® phase in which the data is hardened to the tertiary volumes, the secondary systems may collect the following performance data (i.e., secondary data): average non-volatile storage real time (NVS RT) per rank or extent pool; average cache in real time (CA RT); average rank real time for reads and writes; total average PPRC real time on secondary systems; maximum PPRC real time from secondary systems; minimum PPRC real time from secondary systems; percentage of copy source to target (i.e., a measurement of FlashCopy® performance on the Global Mirror™ secondary systems, when data may be physically copied to a FlashCopy® target) (CSTs); extents allocated for extensible storage engine (ESE); and list of events that could pertain to GM performance (e.g., array rebuilds).

According to at least one embodiment, the data collection process utilized by the self-reporting GM performance program may bundle the data together and may have to send the data back to one of the many FlashCopy® (FLC) commands for each cluster. When a subordinate machine receives this golden FLC response, the subordinate machine may extract the performance metrics, combine the performance metrics with the other cluster/boxes if desired, and temporarily store off the information. Once all FLCs are complete, the subordinate may also gather primary performance data in a bundle and send the data back to the GM Master as part of the FLC response. The Master box (i.e., GM Master) may receive the data of the subordinate boxes (including the internal subordinate) (i.e., primary systems) and store the data in a database based on the CG. The data collection process may be shared between the systems involved. Additionally, there may be a convenience of management gained by connecting to the GM Master to collect data regarding the GM environment, rather than collecting the data from the systems manually.

According to at least one embodiment, the self-reporting GM performance program may allow the user to identify patterns within individual CG groups. The data collection timings of the self-reporting GM performance program may ensure that there is minimal differentiation due to host I/O that may occur during the CG formation. In the present embodiment, the self-reporting GM performance program may utilize the combination of the secondary and primary data to calculate how much of the mirroring response time was from the network. Therefore, the self-reporting GM performance program may be able to clear up issues caused by busy or unstable networks from secondary processing times.

According to at least one embodiment, as an internal part of the self-reporting GM performance program, the GM Master (i.e., one of the primary systems) may control when data collection during the CG cycle starts and stops, as well as when the primary or secondary window may be opened or closed. In the present embodiment, the CG cycle, during which the primary and secondary data may be collected, may be an infinite loop or cycle without an end. During the CG cycle, primary and secondary data may be collected and bundled by the GM Master to create a CG for storage in a user-defined database.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a self-reporting GM performance program 110a. The networked computer environment 100 may also include a server 112 that is enabled to run a self-reporting GM performance program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the self-reporting GM performance program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the self-reporting GM performance program 110a, 110b (respectively) to collect performance data on the CG boundary. The self-reporting GM performance method is explained in more detail below with respect to FIG. 2.

Figure 2:
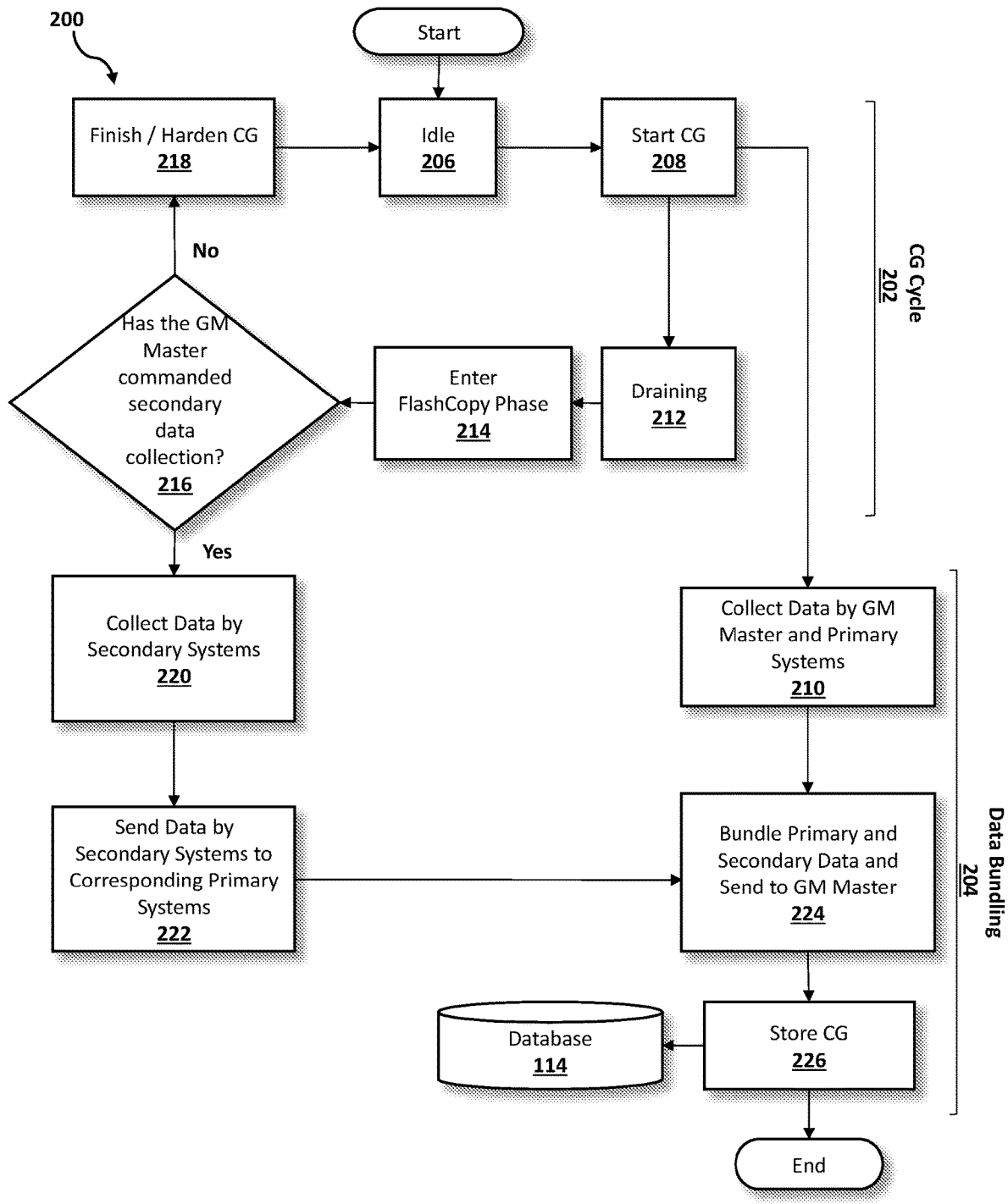
FIG. 2 is an operational flowchart illustrating a process for performance data collection on a consistency group (CG) boundary according to at least one embodiment.

Referring now to FIG. 2, an operational flowchart illustrating the exemplary performance data collection process 200 used by the self-reporting GM performance program 110a and 110b according to at least one embodiment is depicted.

At 206, the self-reporting GM performance program 110a, 110b is idle. The self-reporting GM performance program 110a, 110b may stop running software applications and may start the CG cycle 202. As such, the self-reporting GM performance program 110a, 110b may be in a state of rest or sleep mode while in idle, unless the GM Master commands the start of the performance data collection process 200.

For example, a large software development company regularly accumulates a large quantity of data related to customer usage and software performance. As such, the data computing and storage is integral to the success of the company. On a regular basis, the company utilizes the self-reporting GM performance program 110a, 110b to store the generated data to provide disaster recovery. The self-reporting GM performance program 110a, 110b runs as a continuous cycle, which continuously collects and bundles data and stores the data in an offsite database. First, the self-reporting GM performance program 110a, 110b momentarily stops running any software applications related to the data generated by the company.

Next at 208, the self-reporting GM performance program 110a, 110b starts the consistency group (CG) (i.e., a collection of base volumes or data in a storage array). After the GM Master commands the start of the performance data collection process 200, the CG may start. During the start of CG, the primary window may open to commence collection of primary data (i.e., metadata), and the I/O may be identified for the current CG. At the opening of the primary window, the GM Master may send a signal via a communication network 116 to the other primary systems (e.g., the remaining 31 primary systems separate of the GM Master which is the 32$^{nd}$ primary system) to start collecting primary data. Since the GM Master is also a primary system, the GM Master may also start collecting primary data. Additionally, the self-reporting GM performance program 110a, 110b may identify which I/O may be included in the CG. An I/O received before the start of the CG may be included in the current CG. However, an I/O received after the start of the CG may be excluded from the current CG and instead, included in the next CG.

Additionally, at the initial set-up of the self-reporting GM performance program 110a, 110b, a user may determine which of the primary systems may serve as the GM Master. The GM Master may coordinate the collection of data in the self-reporting GM performance program 110a, 110b.

Continuing the previous example, a pre-determined GM Master commands the start of the CG in which performance data related to the average response time per GM I/O and a list of events related to the GM performance for each piece of data collected by the self-reporting GM performance program 110a, 110b will be collected. As such, self-reporting GM performance program 110a, 110b opens the primary window to collect primary data from the integrated software application.

Then, at 210, the primary data is collected by the GM Master and primary systems. Any primary data (e.g., information on how much data exists and how fast the data may be sent) gathered during the CG start at 208 may be collected by the GM Master and primary systems. After the primary data is collected, the GM Master may command the primary systems to stop data collection for the current CG and commence data collection by the GM Master and primary systems for the next CG.

Continuing the previous example, the performance data related to the average response time per GM I/O and a list of events related to the GM performance for each piece of data collected by the self-reporting GM performance program 110a, 110b on the customer usage and software application performance are collected by the primary systems including the GM Master.

Then, at 212, the self-reporting GM performance program 110a, 110b drains the customer data from the primary systems. The customer data that remained after the primary data was collected by the GM Master and other primary systems at 210 may be removed (i.e., drained) from the secondary systems (e.g., 32 secondary systems in which each secondary system is associated with a primary system including the GM Master) for a mirrored copy of the data that the host wrote to the primary systems. The secondary data (i.e., customer data) gathered by the secondary systems may mirror the primary data. However, the secondary data may be several minutes older than the primary data.

Continuing the previous example, the remaining data not collected by the primary systems and GM Master are drained by the self-reporting GM performance program 110a, 110b. The remaining data includes customer data related to the performance statistics of the software application which is not collected as primary data by the primary systems or GM Master.

Then, at 214, the self-reporting GM performance program 110a, 110b enters the FlashCopy® phase. During the FlashCopy® phase, the self-reporting GM performance program 110a, 110b may create, nearly instantaneously, snapshot copies of the entire logical volumes or data sets of primary or secondary data. Additionally, the self-reporting GM performance program 110a, 110b may close the current window and stop collecting primary or secondary data as directed by the GM Master or the other primary systems.

Continuing the previous example, the self-reporting GM performance program 110a, 110b closes the primary window and stops collecting primary data related to the customer usage and software application performance.

Then, at 216, the self-reporting GM performance program 110a, 110b determines if the GM Master commanded the primary systems to collect secondary data. The GM Master may command the primary systems to first collect primary data, and then the GM Master may command the primary systems to collect secondary data. Based on whether the GM Master commanded the primary systems to collect the secondary data, the self-reporting GM performance program 110a, 110b may repeat the CG cycle to collect the secondary data before proceeding to the data bundling process 204.

Continuing the previous example, the self-reporting GM performance program 110a, 110b may need to determine whether the GM Master commanded the primary systems to collect secondary data. If the GM Master did not command the primary systems to collect secondary data, then the self-reporting GM performance program 110a, 110b may continue to the finish/harden CG at 218 and repeat the CG cycle 202. If, however, the GM Master commanded the primary systems to collect secondary data, then the self-reporting GM performance program 110a, 110b may proceed to the data bundling process 204.

If the self-reporting GM performance program 110a, 110b determines that the GM Master did not command the primary systems to collect secondary data at 216, then the self-reporting GM performance program 110a, 110b may proceed to finish/harden CG at 218. At the finish/harden CG at 218, the self-reporting GM performance program 110a, 110b may continue to add data (e.g., secondary data) to the CG. The GM Master may command the primary systems to start collecting secondary data. The primary systems and the GM Master may prompt the corresponding secondary systems to start collecting secondary data. The secondary window of the self-reporting GM performance program 110a, 110b may then be opened and the self-reporting GM performance program 110a, 110b may repeat the CG cycle 202.

Continuing the previous example, the self-reporting GM performance program 110a, 110b proceeds to finish/harden CG since the GM Master only commanded the collection of primary data, and not the collection of secondary data. Therefore, the secondary window is opened and the GM Master commands the primary systems to collect secondary data related to the performance statistics of the software application. First, the performance statistics of the software application would be collected and any remaining data would be drained from the self-reporting GM performance program 110a, 110b. Then, the self-reporting GM performance program 110a, 110b will enter the FlashCopy® phase in which the secondary window is closed and the collection of secondary data ends.

If, however, the GM Master commanded the primary systems to gather secondary data at 216, then the secondary systems collect the secondary data at 220. The self-reporting GM performance program 110a, 110b may have collected the secondary data and completed the FlashCopy® phase at 214. As such, the secondary window may be closed. Secondary data collection by the secondary systems may stop for the current CG and may start for the next CG, while the self-reporting GM performance program 110a, 110b may proceed to the data bundling process 204.

Continuing the previous example, if the GM Master already commanded the collection of secondary data, then the secondary window would be closed and data collection for the current CG would be stopped. The self-reporting GM performance program 110a, 110b would then proceed to the bundling of the data and storing the created CG into a database.

Then, at 222, the secondary systems send the collected secondary data to the corresponding primary systems. Secondary systems may communicate with the GM Master through the corresponding primary systems. To transmit the secondary data collected by the secondary systems, the secondary systems may transfer the collected data to the corresponding primary systems via the communication network 116. The primary systems may then transmit the collected secondary data to the GM Master to bundle the collected secondary and primary data.

Continuing the previous example, the secondary data related to performance statistics collected by the secondary systems are transmitted to the corresponding primary systems.

Then, at 224, the primary data collected by the GM Master at 210 and the secondary performance data sent to the corresponding primary system at 222 are placed in bundles, and sent to the GM Master. The primary systems may bundle the primary data collected by primary systems, and bundle the secondary data collected by the secondary systems. Then, the primary systems may send the bundled secondary data and the bundled primary data to the GM Master. The GM Master may then bundle the corresponding secondary and primary data bundles to create a CG.

Continuing the previous example, the primary systems bundle the collected performance data and bundle the collected performance statistics data related to the software application performance on customer usage and software application performance. The primary systems then transmit the bundled performance data and bundled performance statistics data to the GM Master. The GM Master then combines bundles of performance data and performance statistics from each primary system to create a CG.

Then, at 226, the GM Master stores the bundled primary and secondary data (i.e., CG) in a database 114. Each of the CG may be stored in database 114 with a unique timestamp (or other solutions to provide consistency using sequence numbers) and file name for retrieval at a later date.

Continuing the previous example, the self-reporting GM performance program 110a, 110b generates the timestamp of 10:33 am for when the CG is created. In addition, the self-reporting GM performance program 110a, 110b generates the file name, "1033AM102517" based on the time and date that the CG was created. The created CG is then stored in an offsite database 114 according to the file name and timestamp of the CG.

According to another embodiment, the user may predefine the settings or parameters on the length of time for which the CG may be stored on the database 114. For example, the user may set the parameters of the self-reporting GM performance program 110a, 110b to terminate or erase any CG that is stored for more than 30 days.

According to another embodiment, the user may predefine the settings to only store abnormalities in the performance data, and not common occurrences in the performance data. Such settings may be set prior to the start of the CG. For example, if the customer data collection lasts longer than the average collection time, then that performance data is stored on the database 114.

According to another embodiment, the GM Master may coordinate the collection of the primary and secondary data, and may make recommendations in terms of tuning the self-reporting GM performance program 110a, 110b using known algorithms.

It may be appreciated that FIG. 2 provides only an illustration of one embodiment and does not imply any limitations with regard to how different embodiments may be implemented. Many modifications to the depicted embodiment(s) may be made based on design and implementation requirements.

Figure 3:
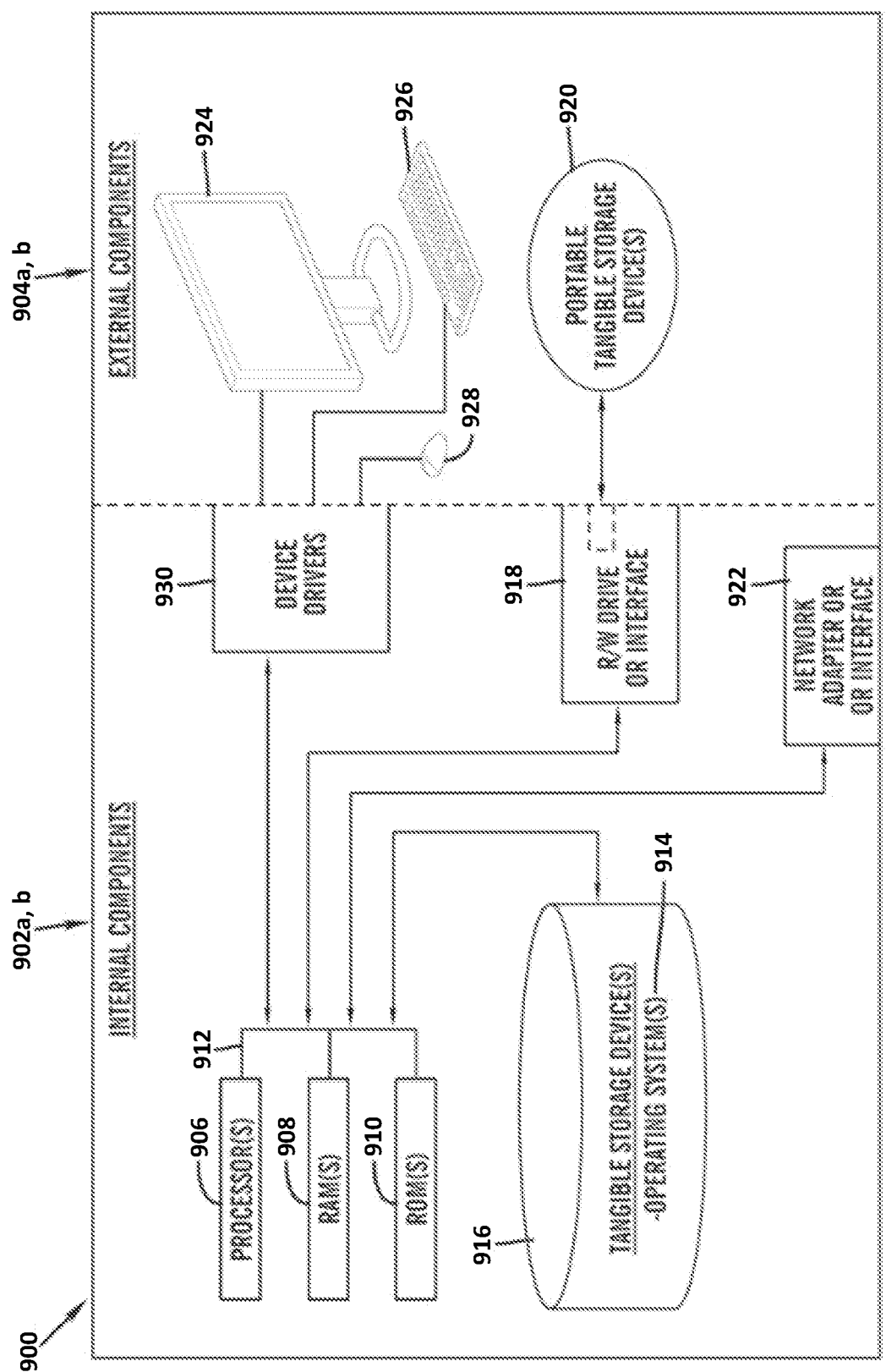
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 3. Each of the sets of internal components 902 a, b includes one or more processors 906, one or more computer-readable RAMs 908, and one or more computer-readable ROMs 910 on one or more buses 912, and one or more operating systems 914 and one or more computer-readable tangible storage devices 916. The one or more operating systems 914, the software program 108 and the self-reporting GM performance program 110a in client computer 102, and the self-reporting GM performance program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the self-reporting GM performance program 110a and 110b can be stored on one or more of the respective portable computer-readable tangible storage devices 920, read via the respective R/W drive or interface 918, and loaded into the respective hard drive 916.

Each set of internal components 902 a, b may also include network adapters (or switch port cards) or interfaces 922 such as a TCP/IP adapter cards, wireless Wi-Fi interface cards, or 3G or 4G wireless interface cards or other wired or wireless communication links. The software program 108 and the self-reporting GM performance program 110a in client computer 102 and the self-reporting GM performance program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the self-reporting GM performance program 110a in client computer 102 and the self-reporting GM performance program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926, and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
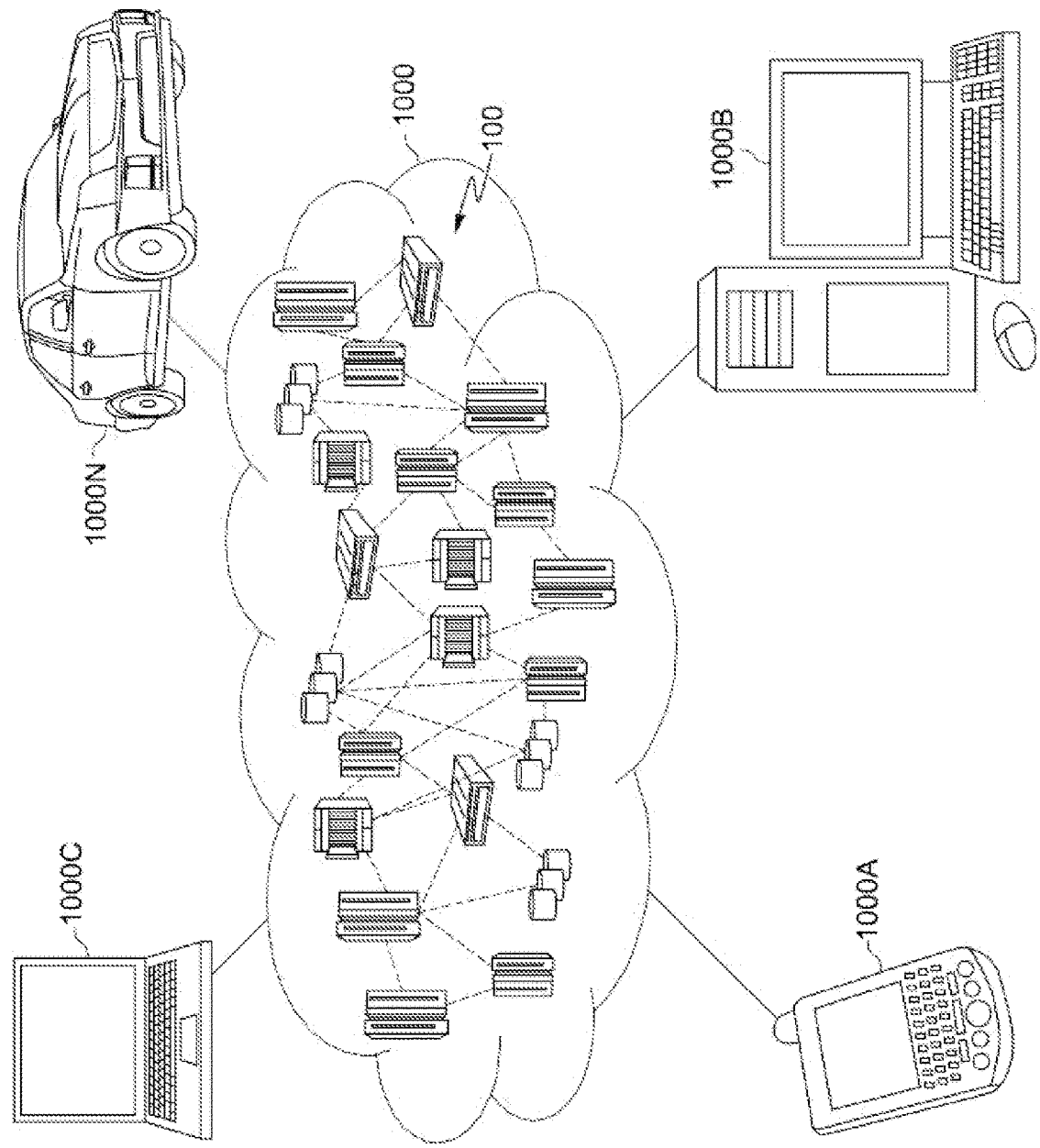
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
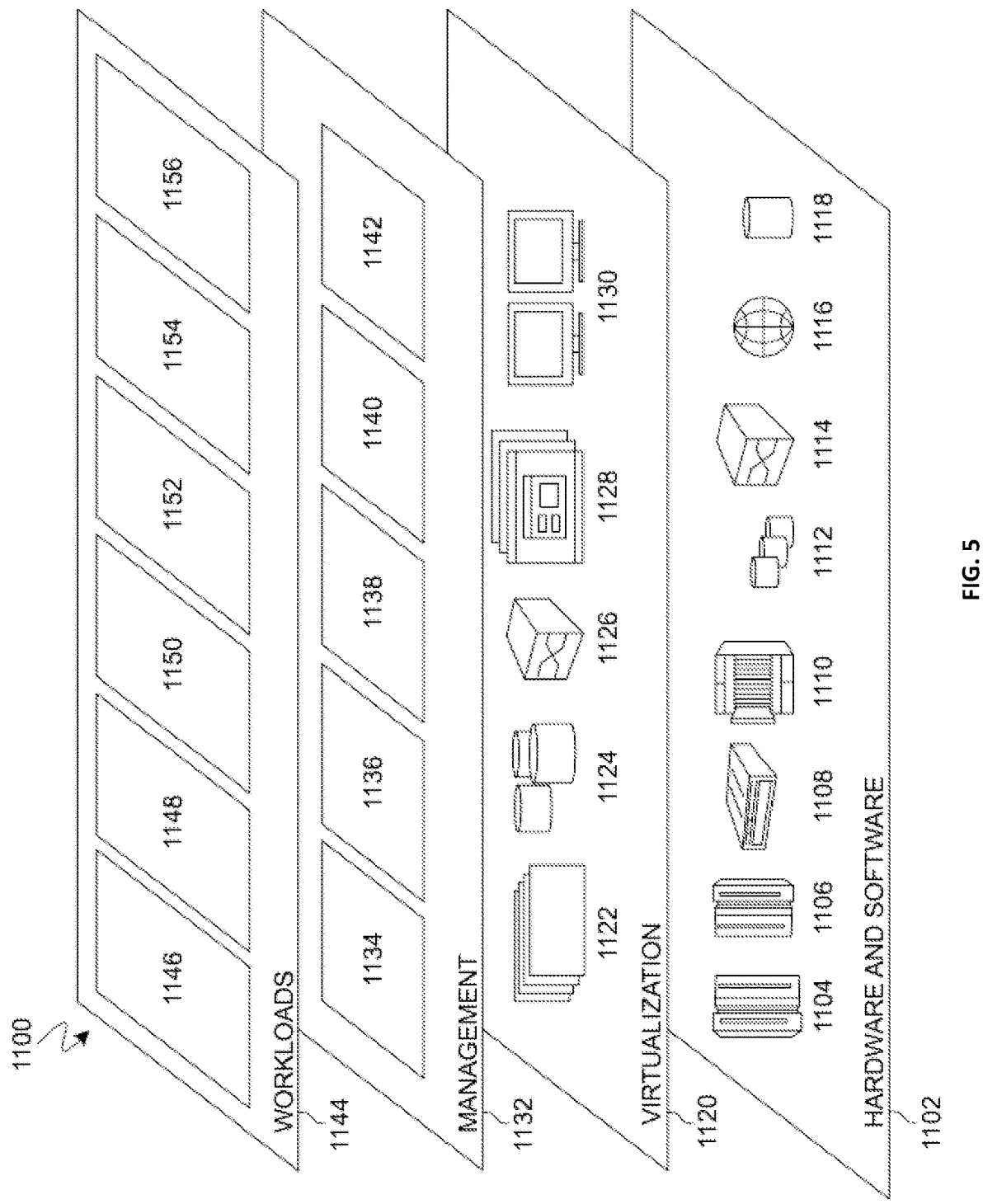
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and self-reporting GM performance 1156. A self-reporting GM performance program 110a, 110b provides a way to collect performance data on a CG boundary.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for collecting performance data of a two-site, data replication program, the method comprising:
   positioning at least one software application at a first site into idle mode;
   starting a consistency group corresponding to the at least one software application, wherein the starting is based on a command from a master system of the two-site data replication program, wherein the master system is at the first site;
   collecting, at the first site, primary performance data associated with the started consistency group;
   removing remaining data associated with the collected primary performance data;
   ending the collecting of the primary performance data;
   replicating the consistency group at the first site to form a copy of the consistency group;
   transmitting the copy of the consistency group to a second site for storage of the copy of the consistency group at the second site, the second site being remote from the first site;
   collecting, at the second site, secondary performance data associated with the started consistency group;
   transmitting the collected primary and secondary performance data to the master system as part of a response to a request for a snapshot copy of a logical volume of data, wherein the logical volume of data that is requested is from the at least one software application;
   bundling the collected secondary performance data to the collected primary performance data to form a bundle; and
   storing the bundle in a database at the first site;
   wherein the collected primary performance data relates to first aspects of the two-site data replication and the collected secondary performance data relates to second aspects of the two-site data replication, the second aspects being different than the first aspects.

2. The method of claim 1, wherein the starting the consistency group further comprises:
   opening a window to commence the collecting of the primary performance data; and
   identifying an input/output for the started consistency group.

3. The method of claim 1, further comprising:
   in response to the commanding the collecting of the secondary performance data, opening a secondary window to commence the collecting of the secondary performance data.

4. The method of claim 1, wherein the method further comprises:
   generating a timestamp for the bundle; and
   generating a file name for the bundle;
   wherein the generated timestamp and the file name are stored in the database at the first site with the bundle.

5. The method of claim 1, wherein primary systems perform the collecting of the primary performance data, wherein the primary systems include the master system;
   wherein secondary systems corresponding, respectively, to the primary systems perform the collecting of the secondary data;
   wherein the primary systems perform the bundling, wherein each of the primary systems forms at least one respective bundle via the bundling; and
   wherein the transmitting of the collected primary and secondary performance data to the master system occurs via transmitting the respective bundles from the primary systems to the master system.

6. The method of claim 5, further comprising:
   bundling, via the master system, the respective bundles to form a combined bundle;
   wherein the storing of the bundle in the database comprises storing the combined bundle in the database.

7. The method of claim 1, wherein a first secondary system at the second site corresponds to the master system at the first site such that the logical volume of data from the master system is stored at the first secondary system.

8. The method of claim 1, wherein the transmitting of the copy of the consistency group from the first site to the second site occurs via a first network; and
   further comprising calculating based on the collected primary performance data and on the collected secondary performance data how much of a mirroring response time was from the first network.

9. The method of claim 1, wherein the primary performance data comprises first primary performance data that is collected before a snapshot copy phase for the consistency group begins.

10. The method of claim 1, wherein the primary performance data comprises second phase primary performance data that is collected during a snapshot copy phase for the consistency group.

11. The method of claim 1, wherein the primary performance data comprises first primary performance data and second phase primary performance data;
    wherein the first primary performance data is collected before a snapshot copy phase for the consistency group begins; and
    wherein the second phase primary performance data is collected during a snapshot copy phase for the consistency group.

12. The method of claim 11, further comprising bundling the first primary performance data for a primary system together with the second phase primary performance data for the primary system into a primary performance data bundle.

13. The method of claim 1, further comprising receiving a command of which primary system amongst a plurality of primary systems is to function as the master system.

14. The method of claim 1, wherein the remaining data that is removed comprises customer data.

15. The method of claim 1, wherein the primary performance data and the secondary performance data consist of data abnormalities.

16. A computer system for collecting performance data of a two-site data replication program, the computer system comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
    positioning at least one software application at a first site into idle mode;
    starting a consistency group corresponding to the at least one software application, wherein the starting is based on a command from a master system of the two-site data replication program, wherein the master system is at the first site;

collecting, at the first site, primary performance data associated with the started consistency group;

removing remaining data associated with the collected primary performance data;

ending the collecting of the primary performance data;

replicating the consistency group at the first site to form a copy of the consistency group;

transmitting the copy of the consistency group to a second site for storage of the copy of the consistency group at the second site, the second site being remote from the first site;

collecting, at the second site, secondary performance data associated with the started consistency group;

transmitting the collected primary and secondary performance data to the master system as part of a response to a request for a snapshot copy of a logical volume of data, wherein the logical volume of data that is requested is from the at least one software application;

bundling the collected secondary performance data to the collected primary performance data to form a bundle; and storing the bundle in a database at the first site;

wherein the collected primary performance data relates to first aspects of the two-site data replication and the collected secondary performance data relates to second aspects of the two-site data replication, the second aspects being different than the first aspects.

17. The computer system of claim 16, wherein the starting the consistency group further comprises:

opening a window to commence the collecting of the primary performance data; and identifying an input/output for the started consistency group.

18. The computer system of claim 16, wherein the method further comprises:

in response to the commanding the collecting of the secondary performance data, opening a secondary window to commence the collecting of the secondary performance data.

19. A computer program product for collecting performance data of a two-site, data replication program, the computer program product comprising:

one or more computer-readable storage media and program instructions stored on at least one of the one or more tangible storage media, the program instructions executable by a processor to cause the processor to perform a method comprising:

positioning at least one software application at a first site into idle mode;

starting a consistency group corresponding to the at least one software application, wherein the starting is based on a command from a master system of the two-site data replication program, wherein the master system is at the first site;

collecting, at the first site, primary performance data associated with the started consistency group;

removing remaining data associated with the collected primary performance data;

ending the collecting of the primary performance data;

replicating the consistency group at the first site to form a copy of the consistency group;

transmitting the copy of the consistency group to a second site for storage of the copy of the consistency group at the second site, the second site being remote from the first site;

collecting, at the second site, secondary performance data associated with the started consistency group;

transmitting the collected primary and secondary performance data to the master system as part of a response to a request for a snapshot copy of a logical volume of data, wherein the logical volume of data that is requested is from the at least one software application;

bundling the collected secondary performance data to the collected primary performance data to form a bundle; and storing the bundle in a database at the first site;

wherein the collected primary performance data relates to first aspects of the two-site data replication and the collected secondary performance data relates to second aspects of the two-site data replication, the second aspects being different than the first aspects.

20. The computer program product of claim 19, wherein the ending the collecting of the primary performance data further comprises:

closing a current window associated with the collecting of the primary performance data.

* * * * *